June 10, 1958 — J. A. LAUCK — 2,838,074
FLUID PRESSURE HOSE
Filed Dec. 6, 1954
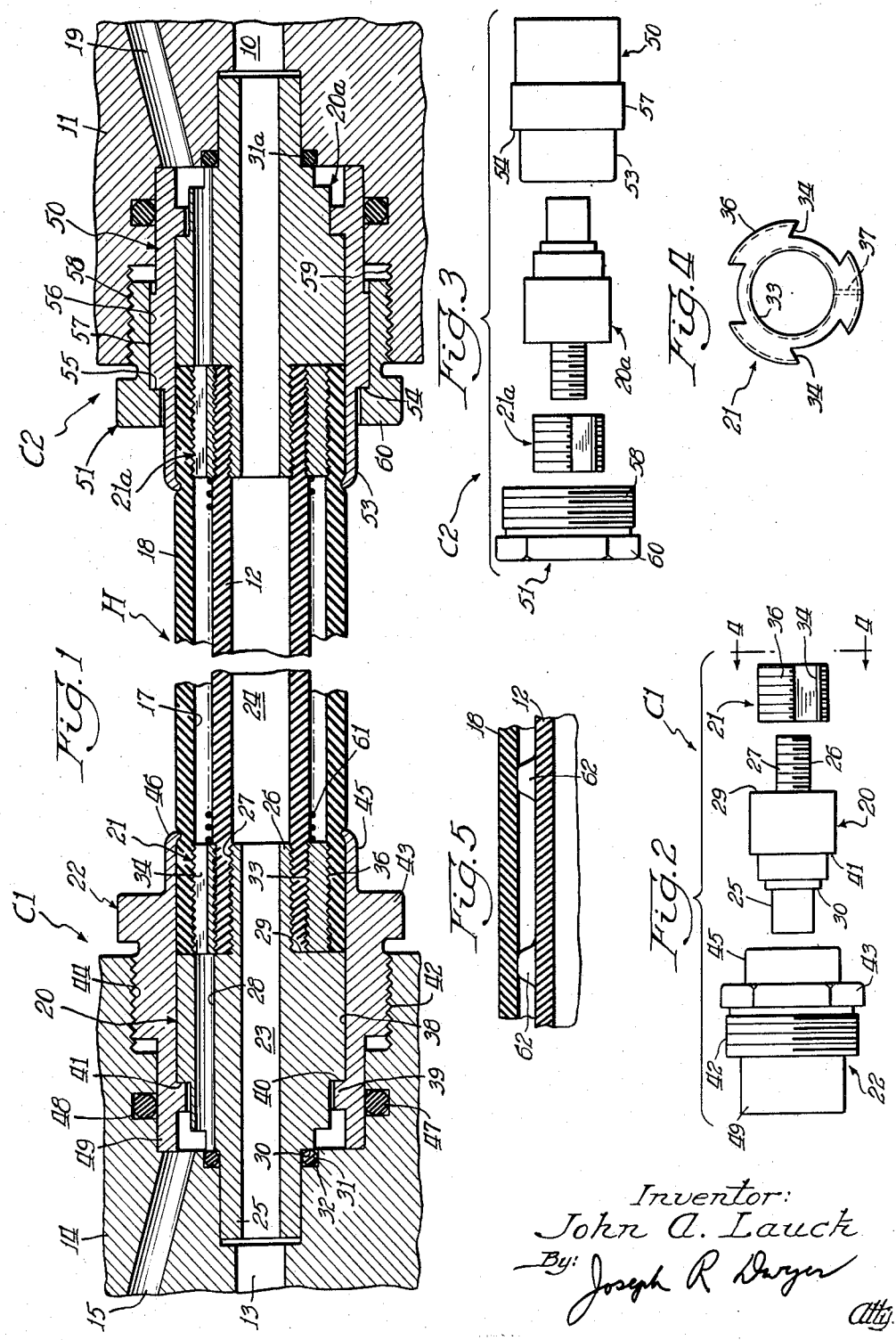
Inventor:
John A. Lauck
By: Joseph R. Dwyer
Atty.

United States Patent Office 2,838,074
Patented June 10, 1958

2,838,074

FLUID PRESSURE HOSE

John A. Lauck, Shaker Heights, Ohio, assignor to Borg-Warner Corporation, Chicago, Ill., a corporation of Illinois Application December 6, 1954, Serial No. 473,387

5 Claims. (Cl. 138—49)

My invention relates in general to the communication of pressure fluids and is particularly concerned with a new and improved hose assembly for communicating fluid pressure from a pressure source to a pressure utilization device, such as a fluid motor and return.

Heretofore, it has been necessary and customary, to communicate fluid such as oil, water, air, gas and the like, from a source of high pressure, such as a pump, to a pressure utilization device to utilize one hose with at least a pair of couplings and to utilize a separate and distinct hose, with at least a pair of couplings to return fluid from the utilization device to a sump. This system necessitated a development toward heavier and more complicated hose construction for pressure hoses as well as a development toward expensive and more complicated couplings. Obviously, this resulted in expensive, cumbersome and complicated systems where innumerable hoses and couplings are needed in a system with one or more pumps and one or more utilization devices.

My invention, therefore, has for its major accomplishment a reduction in the number of parts used in communicating high fluid inlet pressure and return fluid under lower pressure to and from the fluid utilization device, and I propose to accomplish this major objective by the provision of a high fluid pressure inlet hose disposed within a larger diameter low pressure return hose, both of which are simply and conveniently connected to a source of high pressure and a utilization device by simple and inexpensive couplings. In other words, my invention contemplates the use of a pair of hoses or conduits, one disposed within the other, one of which is used to communicate fluid from a source of high fluid pressure to a utilization device and the other is used to return fluid to a sump and which for all practical purposes presents at least in its outer appearances a single hose connection between said source of high pressure, said pressure utilization device and return.

A more specific object of my invention is the provision of a hose-within-a-hose construction presenting a unitary, single hose connection between a source of high pressure and a fluid responsive motor and return.

Still another and more specific object of my invention is to provide a new and improved hose-within-a-hose assembly for conveying and returning fluid pressure to and from a pressure utilization device with suitable couplings for connecting this assembly to a source of high fluid pressure and to a fluid pressure utilization device and return.

Still another and more specific goal of my invention is to provide a hose-within-a-hose assembly for conveying and returning high pressure to and from a pressure utilization device, which assembly reduced the cost of manufacture of high and low pressure hose assemblies.

Still another specific accomplishment of my invention is the provision of a simple and inexpensively manufactured coupling for connecting my hose-within-a-hose assembly either to a source of pressure or to a pressure utilization device.

Further and more specific objects and accomplishments of my invention will become apparent in the description of my invention herein below in connection with the accompanying drawings which form a part thereof and wherein:

Figure 1 is a side elevational view in section showing to advantage the hose-in-a-hose assembly constructed in accordance with the teachings of my invention;

Figure 2 is a detailed exploded view of the coupling shown at the left end of Figure 1 in unassembled relationship;

Figure 3 is a detailed exploded view of the coupling shown at the right end of Figure 1 in unassembled relationship;

Figure 4 is a view along line 4—4 of Figure 2 and showing to advantage the construction of one of the elements of the coupling, shown in Figures 1, 2 and 3 which permits the free flow of fluid between the couplings and the hoses; and Figure 5 is an enlarged sectional view of an alternative embodiment of my hose-in-a-hose assembly.

Referring now to the drawings and particularly Figure 1 thereof, I have illustrated my invention as comprising a first coupling assembly, shown at the left and indicated in its entirety as C–1; a second coupling assembly, shown at the right and indicated in its entirety as C–2; interconnected by a pair of inner and outer fluid pressure conduits or hoses, shown in the drawing coaxially and indicated in their entirety as H. In the embodiment shown, fluid under pressure is communicated from a source of fluid pressure, such as a pressure generator or pump (not shown) through passage or conduit 10 formed in housing 11, through coupling assembly C–2 and inner inlet hose 12, through coupling assembly C–1 to be communicated to a pressure utilization device or motor (not shown) through passage or conduit 13 formed in housing 14. Low or reduced fluid pressure returning from the pressure utilization device is communicated through passage or conduit 15 formed in housing 14, through coupling assembly C–1, through passage or conduit 17 formed by the outer periphery of inner hose 12 and the inner periphery of outer hose 18, through coupling assembly C–2 to be returned to sump (not shown) through passage 19.

It can be seen from the above brief description that my invention contemplates a relatively simple hose assembly in which fluid pressure can be communicated from a source of fluid pressure to a fluid pressure utilization device and return, through, from outside appearances at least, a single hose or conduit utilizing one coupling on each end thereof.

To more specifically describe my invention, attention is now directed to coupling assembly C–1, illustrated in the embodiment shown on left-hand portion of Figure 1. It can be seen that this coupling assembly comprises generally, three main members, inner member 20, a ring-like member 21 suitably arranged over the right-hand portion of the inner member 20, and outer member 22 encompassing inner member 20 and ring-like member 21. Inner member 20 is cylindrical in shape and has an axial bore 23 formed therein and arranged with respect to passage 13 of housing 14 and inner passage 24 of inner hose 12 to communicate fluid pressure from hose 12 to passage 13 and is further provided with an axial cylindrical extension 25 on the left end thereof and axial cylindrical extension 26 on the right end thereof. Axial extensions 25 and 26 are of reduced diameter as compared to the diameter of the main body of inner member 20. Axial cylindrical extension 26 is suitably threaded or ferruled, as indicated at 27, on its outer circumferential surface to sealably engage high pressure inlet hose 12 in the manner shown. Inner member 20 is also provided with a plurality of axially extending bores or passages 28 (one shown) spaced radially from axial bore 23 and arranged when the coupling is assembled as shown to communicate return fluid pressure from return passage 15 of housing 14 to fluid passage 17 formed by the outer circumference of high pressure inlet hose 12 and the inner bore of low pressure return hose 18 as aforesaid. Reduced axial extension 26 provides inner member 20 with a radially extending surface 29 against which ring member 21 comes to rest when the coupling assembly is completely assembled as shown. At the opposite end, reduced extension 25 provides a radially extending step-like portion 30 which serves to squeeze O-ring seal 31 disposed in counter bore 32 formed in housing 14 when the coupling assembly is assembled in the housing 14 to provide a fluid type relationship between inlet pressure passage 13, return pressure passage 15, and conduits 27.

Turning now to ring-like member 21, shown in Figures 1 and 4, it can be seen that the inner periphery of the ring-like member is suitably threaded or ferruled, as at 33, to cooperate with ferruled reduced extension 26 of inner member 20 to affix inner hose 12 in fluid tight relationship with the reduced extension. Ring-like member 21 is also provided with a plurality of slots 34 opening radially outwardly, as shown in Figure 4, to cooperate with conduits 26 of inner member 20 when in assembled relationship as shown in Figure 1. The outer circumference of ring-like member 21 is also threaded or ferruled as at 36 to sealably engage outer hose 18 in fluid tight relationship. Thus, it can be seen that ring-like member 21 sealably affixes inner fluid pressure hose 12 to inner member 20 and further cooperates with outer member 22 to sealably affix outer fluid-pressure hose 18 in the coupling assembly C–1 in a manner more hereinafter fully described. Ring-like member can also be split as indicated at 37 in Figure 4 to provide more resiliency, if desired.

Outer member 22 is provided with a relatively large axial inner bore 38 to receive inner member 20 and is further provided with a radially inwardly extending ridge-like projection 39, radially inwardly extending surface 40 of which cooperates, when assembled in the manner shown, with radially extending step-like portion 41 formed on inner member 20 to limit the leftward movement of inner member 20 with respect to outer member 22 in the assembly of the coupling as will be more fully explained hereinafter. The outer diameter of outer member 22 provided with a threaded portion 42 and a hexagonally formed nut-like portion 43 to conveniently assemble the coupling assembly in housing 14 through the cooperation of threads 44 of housing 14 in the conventional manner. The right end portion of the outer member 22 is provided a relatively thin cylindrical sleeve-like extension 45, a portion 46 of which is deformed during the assembly of the coupling, to cooperate with the ring-like member 21 to sealably affix the outer hose 18 in the coupling assembly. O-ring seal 47 disposed in a suitably formed groove 48 in housing 14 sealably engages the outer periphery of reduced portion 49 of outer member 22 to prevent leakage between the housing 14 and coupling assembly C–1.

In order to more clearly explain coupling assembly C–1 and the manner in which it is sealably affixed to the inner hose 12 and outer hose 18, attention is now directed to Figure 2 of the drawings where there is shown coupling assembly C–1 in unassembled relationship.

In one convenient manner of assembling the coupling assembly, ring-like member 21 is threaded or spun onto the outer diameter of inner hose 12 by means of ferrules 33 on the inner diameter of ring-like member 21 and hose 12 is then threaded or spun by means of the ferrules 27 on extension 25 to provide a fluid-tight seal between the inner member 20 and the hose 12. Outer low pressure hose 18 is then threaded or spun on the outer diameter of ring-like member 21 through the cooperation of ferrules or threads 36 and the end portion of each of these elements—hose 18, ring-like member 21 and hose 12—are preferably brought into engagement with the inwardly extending surface 29 of inner member 20 in the manner shown. The coupling assembly, now partially assembled, is inserted in the large axial inner bore 38 of the outer member 22 until the radially outwardly extending step-like surface 41 engages radially inwardly extending surface 40 of ridge-like portion 39. Sleeve-like cylindrical portion 45 of outer member 22 is squeezed or clamped as indicated at 46 in Figure 1 about the outer hose 18 to completely assemble coupling C–1. The entire coupling assembly C–1 can then be threadably inserted in the housing 14 by the cooperation of external threads 42 and internal threads 44 of the housing 14, hexagonal portion 43 being used to tighten the coupling assembly in the conventional manner. When the coupling assembly C–1 is then assembled the radially extending step-like portion 30 of left reduced extension 25 of the inner member 20 squeezes O-ring seal 31 to provide a fluid-tight relationship between the high pressure conduit 13 and the low pressure conduit 15 as aforesaid.

Turning now to assembly C–2 at the right hand portion of Figure 1, and together with Figure 3 showing coupling assembly C–2 in exploded unassembled relationship it can be seen that this coupling assembly C–2 contains some identical parts or elements as coupling assembly C–1. These identical elements or parts in coupling C–2 are identified in coupling assembly C–2 by numerals which correspond to the same part in coupling assembly C–1 except that the numeral is followed by small letter *a*. It is to be noted, however, that the outer member of coupling assembly C–2, which would normally correspond to outer member 22 in coupling assembly C–1 comprises two parts—an inner sleeve-like part 50 and outer sleeve-like part 51; which will allow the hose assembly to be coupled to housings 11 and 14 as hereinafter more fully explained. The coupling assembly C–2 is assembled in exactly the same manner as coupling assembly C–1 is assembled on hoses 12 and 18; inner part 50 being provided at its left, as viewed in Figure 1, with a radially-extending reduced sleeve-like cylindrical portion 53 which corresponds identically with reduced sleeve-like portion 45 and performs same function. Inner part 50 also provided centrally thereof, with a radially outwardly extending step-like surface 54 which cooperate with radially inwardly extending step-like surface 55 formed on outer part 51, and inner bore 56 of outer part 51 is adapted to receive the outer circumference 57 of inner part 50 in the manner shown. Outer part 51 is provided with a suitably threaded portion 58 to threadably engage internal threads 59 of housing 11, and there is also provided a hexagonal nut-like portion 60 on the outer part 51 to allow the coupling assembly C–2 to be conveniently tightened into the housing 11 in a manner similar to coupling assembly C–1. Thus, when the inner member 20a, ring-like member 21a, and inner part 50 has been sealably affixed to inner and outer hoses 12 and 18 respectively, with inner part 50 loosely and rotatably received in bore 56 of outer part 51, the coupling assembly C–2 is ready to be inserted in the housing 11 when desired. When the coupling assembly C–2 is tightened in place, O-ring seal 31a at the right end of C–1 prevents leakage of pressure from high-pressure passage 10 to return pressure passage 19.

As previously stated, the provision of the two parts in coupling assembly C–1, inner and outer parts 50 and 51, respectively, will permit the entire hose assembly to be coupled to housings 11 and 14. It can be seen that since coupling assembly C–1 is rigidly affixed to the hoses, when coupling assembly C–1 is inserted in the housing 14, the hoses 12 and 16 must turn therewith and unless some provision is made, such as the provision of part 51 which turns freely and independently of the hoses, the coupling assembly C–2 could not be rotatively tightened in the housing 11. It is important to note also that the outer diameter of outer member 22 of coupling assembly C–1 is the same as the outer diameter of outer part 51 of coupling assembly C–2 so that the hose assembly is reversible and the coupling assemblies are interchangeable in the housings.

In the embodiment shown in Figure 1, it is evident that the inner hose 12 is braided about its outer periphery with wire 61 for reinforcing the outer diameter of the hose 12 as is well-known in high pressure hoses. This type of hose is usually made by providing the first flexible rubber-like material with the wire braiding 61 which then is covered with still another flexible rubber-like layer to provide a complete high pressure hose. However, in a hose-within-a-hose assembly, constructed in accordance with the teaching of my invention, it has been found that this outer layer over the wire threads can be eliminated entirely, reducing the cost of manufacture of high pressure hoses. Any high pressure that may be lost by hose 12 will merely return to sump by passage 17.

In the event that it is found necessary in certain operations to maintain inner hose 12 at a uniform radial distance from hose 18, attention is directed to Figure 5 where high pressure hose 12 is provided with plurality of radially extending spacer lugs 62. These spacer lugs can be of any desired form and can be spaced apart as desired to permit free flow of fluid through passage 17.

From the above description it can be seen that my invention provides a hose-within-a-hose assembly for transferring fluids from a pressure source to a pressure utilization device and return, which is simple, economical to manufacture and capable of being produced according to mass production methods. It is apparent also that while I have described my invention in its preferable function, namely for transferring fluids from a pressure source to a pressure utilization device and return to sump, it is evident that my invention could be utilized to connect two independent sources of pressure to two separate pressure utilization devices, if desired.

Where herein the various parts of my invention have been referred to as being located at the right or the left it will be understood that this was done solely for the purpose of facilitating description and that such references relate only to the relative positions of the parts as shown in the accompanying drawing.

I claim:

1. A fluid pressure communicating assembly comprising means defining a first conduit and a second conduit, said first conduit being disposed within said second conduit, said first conduit providing thereby an inner fluid pressure passage and having its outer periphery cooperating with said second conduit to provide an outer fluid pressure passage, and means defining couplings connecting said inner passage and said outer passage to sources of fluid pressure, said means defining couplings comprising inner members for communicating fluid pressure to and from said inner passage and including means for communicating fluid to and from said outer passage, ring-like means for sealably affixing said inner disposed conduit to said inner members and cooperating with said means for communicating fluid pressure to and from said outer fluid pressure passage to communicate fluid pressure therethrough, and outer members cooperating with said inner members, ring-like means and said inner and outer conduits for sealably affixing said outer conduit to said inner members and ring-like means and thereby defining a unitary fluid pressure communicating assembly, said outer members being further provided with means for being connected to sources of fluid pressure.

2. In a hose-within-a-hose assembly for communicating fluid pressure means defining a first flexible hose and a second flexible hose, said first hose being disposed within said second hose, said first hose providing thereby an inner fluid pressure passage and having its outer periphery cooperating with said second hose to provide an outer fluid pressure passage, and means defining couplings for connecting said inner hose to a source of fluid pressure and to a pressure utilization device and said outer passage to return pressure from said pressure utilization device, said means defining couplings comprising an inner member for communicating fluid pressure to and from said inner hose and including means for communicating fluid to and from said outer passage, ring-like means for sealably affixing said inner hose to said inner members and cooperating with said means for communicating fluid pressure to and from said outer fluid pressure passage to communicate fluid pressure therethrough, and outer members cooperating with said inner member, ring-like means and said inner and outer hoses for sealably affixing said outer hoses to said inner member and ring-like means and thereby defining a unitary hose-within-a-hose assembly, said outer members being further provided with means for connecting said assembly to a source of pressure and a pressure utilization device.

3. In a hose-within-a-hose assembly for communicating fluid pressure means defining a first flexible hose and a second flexible hose, said first hose being disposed within said second hose, said first hose providing thereby an inner fluid pressure passage and having its outer periphery cooperating with said second hose to provide an outer fluid pressure passage, and means defining couplings for connecting said inner hose to a source of fluid pressure and to a pressure utilization device and said outer passage to return pressure from said pressure utilization device, said means defining couplings each comprising an inner member having an axial substantially centrally located bore formed therein for communicating fluid pressure to and from said inner hose and including means defining at least one axial outer passage radially located with respect to said centrally located bore for communicating fluid pressure to said outer passage, ring-like means disposed over a portion of each said inner members for sealably affixing said inner hose to said inner members and cooperating with said outer passages for communicating fluid pressure to and from said outer fluid pressure passage, and an outer member cooperating with each said inner member, ring-like means and said inner and outer hoses for sealably affixing said outer hose to each said inner members and ring-like means and thereby defining a unitary hose-within-a-hose assembly, each said outer member being further provided with means for connecting said assembly to a source of pressure and a pressure utilization device respectively.

4. Coupling means for a fluid pressure hose assembly comprising an inner member adapted to be connected to a source of fluid pressure for communicating fluid pressure to a first inner hose, said inner member including means adapted to be connected to a pressure utilization device for communicating return fluid pressure to an outer passage formed by said inner hose and an outer hose, ring-like means cooperating with a portion of said inner member for affixing said inner hose to said inner member and cooperating with said means for communicating fluid to said outer fluid pressure passage to allow fluid pressure therethrough, and an outer member cooperating with said inner member, ring-like means and said inner and outer hoses for sealably affixing said outer hose to said inner member and ring-like means and thereby defining a complete coupling, said outer member being further provided with means for connecting said coupling and hoses to a source of high pressure and return pressure.

5. Coupling means for a fluid pressure hose assembly comprising an inner member adapted to be connected to a source of fluid pressure for communicating fluid pressure to a first inner hose, said inner member including means adapted to be connected to a pressure utilization device for communicating return fluid pressure to an outer passage formed by said inner hose and an outer hose, ring-like means cooperating with a portion of said inner member for affixing said inner hose to said inner member and cooperating with said means for communicating fluid to said outer fluid pressure passage to allow fluid pressure therethrough, and an outer member cooperating with said inner member, ring-like means and said inner and outer hoses for sealably affixing said outer hose to said inner member and ring-like means and thereby defining a complete coupling, said outer member being provided with means for connecting said coupling and hose to a source of high pressure and return pressure, said outer member being further characterized by being formed of two relatively movable parts.

References Cited in the file of this patent

UNITED STATES PATENTS

| | | |
|---|---|---|
| 2,475,635 | Parsons | July 12, 1949 |
| 2,663,325 | Bede | Dec. 22, 1953 |